(12) United States Patent
Yamamoto

(10) Patent No.: US 12,606,046 B2
(45) Date of Patent: Apr. 21, 2026

(54) ELECTRIC VEHICLE CHARGING MANAGEMENT SYSTEM USING DELIVERY-BASED CONNECTOR ATTACHMENT AND DETACHMENT

(71) Applicant: SUBARU CORPORATION, Tokyo (JP)

(72) Inventor: Yoshitaka Yamamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 796 days.

(21) Appl. No.: 18/055,939

(22) Filed: Nov. 16, 2022

(65) Prior Publication Data

US 2023/0166629 A1 Jun. 1, 2023

(30) Foreign Application Priority Data

Nov. 29, 2021 (JP) ................................. 2021-192731

(51) Int. Cl.
B60L 53/68 (2019.01)
B60L 53/14 (2019.01)
(Continued)

(52) U.S. Cl.
CPC .............. B60L 53/68 (2019.02); B60L 53/14 (2019.02); B60L 53/62 (2019.02); B60L 55/00 (2019.02);
(Continued)

(58) Field of Classification Search
CPC .......... B60L 53/68; B60L 53/14; B60L 53/62;

B60L 55/00; B60L 2260/58; G06Q 10/06311; G06Q 10/1097; G06Q 10/083; G06Q 30/0601; G06Q 10/08365; H02J 7/0048

See application file for complete search history.

(56) References Cited

U.S. PATENT DOCUMENTS

2017/0024686 A1 * 1/2017 Thramann .............. G06Q 30/00
2021/0019699 A1 * 1/2021 Bornski ............... G05D 1/0022
(Continued)

FOREIGN PATENT DOCUMENTS

DE      102017008077 A1 * 2/2018 .............. B60L 53/35
JP      2020-107303 A      7/2020
KR      20230007822 A * 1/2023 ............ B60L 53/305

*Primary Examiner* — Julian D Huffman
*Assistant Examiner* — John P Ondrasik
(74) *Attorney, Agent, or Firm* — Rimon P.C.

(57) ABSTRACT

A substitution system includes a vehicle including a battery and a charging port electrically coupled to the battery, a connector configured to be detachably attached to the port and to supply power from outside to the vehicle or from the vehicle to outside, and a control device including a processor and a memory. The processor is configured to determine whether the vehicle is at a delivery destination, and when determining that the vehicle is at the delivery destination, acquire the state of charge (SOC) of the vehicle battery and information indicating whether the connector is coupled to the port, and based on the SOC and the information, determine whether to set attachment substitution in which a delivery person who visits the delivery destination to deliver an item attaches the connector to the port or detachment substitution in which the delivery person detaches the connector from the port.

7 Claims, 12 Drawing Sheets

| | SOC | COUPLING CONDITION INFORMATION | CHARGE/DISCHARGE SETTING | SUBSTITUTION DETAIL | STATUS |
|---|---|---|---|---|---|
| A | BELOW THRESHOLD | UNCOUPLED | CHARGE SETTING | ATTACHMENT SUBSTITUTION (CHARGE) | START CHARGING |
| B | BELOW THRESHOLD | UNCOUPLED | DISCHARGE SETTING | NO SUBSTITUTION | NO DISCHARGING |
| C | BELOW THRESHOLD | COUPLED | CHARGE SETTING | NO SUBSTITUTION | CHARGING |
| C | BELOW THRESHOLD | COUPLED | CHARGE SETTING | DETACHMENT SUBSTITUTION | CHANGE DESIGNATED DELIVERY TIME (TERMINATE CHARGING AFTER CHANGE) |
| D | BELOW THRESHOLD | COUPLED | DISCHARGE SETTING | DETACHMENT SUBSTITUTION | TERMINATE DISCHARGING |
| E | THRESHOLD OR GREATER | UNCOUPLED | CHARGE SETTING | NO SUBSTITUTION | NO CHARGING |
| F | THRESHOLD OR GREATER | UNCOUPLED | DISCHARGE SETTING | ATTACHMENT SUBSTITUTION (DISCHARGE) | START DISCHARGING |
| G | THRESHOLD OR GREATER | COUPLED | CHARGE SETTING | DETACHMENT SUBSTITUTION | TERMINATE CHARGING |
| H | THRESHOLD OR GREATER | COUPLED | DISCHARGE SETTING | NO SUBSTITUTION | DISCHARGING |

(51) Int. Cl.

| | |
|---|---|
| *B60L 53/62* | (2019.01) |
| *B60L 55/00* | (2019.01) |
| *G06Q 10/0631* | (2023.01) |
| *G06Q 10/109* | (2023.01) |
| *H02J 7/82* | (2026.01) |
| *G06Q 10/083* | (2024.01) |

(52) U.S. Cl.
CPC ... *G06Q 10/06311* (2013.01); *G06Q 10/1097*
(2013.01); *H02J 7/82* (2026.01); *B60L*
*2260/58* (2013.01); *G06Q 10/083* (2013.01)

(56) References Cited

U.S. PATENT DOCUMENTS

| | | | |
|---|---|---|---|
| 2021/0162874 A1* | 6/2021 | Lee ....................... | H02J 7/0048 |
| 2021/0347275 A1* | 11/2021 | Chakraborty .... | G06Q 10/06315 |
| 2023/0128979 A1* | 4/2023 | Kinsey ................... | B60L 53/80 |
| | | | 320/109 |
| 2023/0391222 A1* | 12/2023 | Yamamoto ............. | G06Q 10/02 |
| 2024/0144398 A1* | 5/2024 | Paik ....................... | B60L 53/68 |

* cited by examiner

FIG. 3

| | SOC | COUPLING CONDITION INFORMATION | CHARGE/DISCHARGE SETTING | SUBSTITUTION DETAIL | STATUS |
|---|---|---|---|---|---|
| A | BELOW THRESHOLD | UNCOUPLED | CHARGE SETTING | ATTACHMENT SUBSTITUTION (CHARGE) | START CHARGING |
| B | BELOW THRESHOLD | UNCOUPLED | DISCHARGE SETTING | NO SUBSTITUTION | NO DISCHARGING |
| C | BELOW THRESHOLD | COUPLED | CHARGE SETTING | NO SUBSTITUTION | CHARGING |
| D | BELOW THRESHOLD | COUPLED | DISCHARGE SETTING | DETACHMENT SUBSTITUTION | CHANGE DESIGNATED DELIVERY TIME (TERMINATE CHARGING AFTER CHANGE) |
| E | THRESHOLD OR GREATER | UNCOUPLED | CHARGE SETTING | DETACHMENT SUBSTITUTION | TERMINATE DISCHARGING |
| F | THRESHOLD OR GREATER | UNCOUPLED | DISCHARGE SETTING | NO SUBSTITUTION | NO CHARGING |
| G | THRESHOLD OR GREATER | COUPLED | CHARGE SETTING | ATTACHMENT SUBSTITUTION (DISCHARGE) | START DISCHARGING |
| H | THRESHOLD OR GREATER | COUPLED | DISCHARGE SETTING | DETACHMENT SUBSTITUTION | TERMINATE CHARGING |
| | THRESHOLD OR GREATER | COUPLED | DISCHARGE SETTING | NO SUBSTITUTION | DISCHARGING |

FIG. 9

| | CHARGE/DISCHARGE SETTING | SOC | COUPLING CONDITION INFORMATION | SUBSTITUTION DETAIL | STATUS |
|---|---|---|---|---|---|
| a | CHARGE SETTING | BELOW CHARGE THRESHOLD | UNCOUPLED | ATTACHMENT SUBSTITUTION (CHARGE) | START CHARGING |
| b | CHARGE SETTING | BELOW CHARGE THRESHOLD | COUPLED | NO SUBSTITUTION | CHARGING |
| | | | | DETACHMENT SUBSTITUTION | CHANGE DESIGNATED DELIVERY TIME (TERMINATE CHARGING AFTER CHANGE) |
| c | CHARGE SETTING | CHARGE THRESHOLD OR GREATER | UNCOUPLED | NO SUBSTITUTION | NO CHARGING |
| d | CHARGE SETTING | CHARGE THRESHOLD OR GREATER | COUPLED | DETACHMENT SUBSTITUTION | TERMINATE CHARGING |
| e | DISCHARGE SETTING | BELOW DISCHARGE THRESHOLD | UNCOUPLED | NO SUBSTITUTION | NO DISCHARGING |
| f | DISCHARGE SETTING | BELOW DISCHARGE THRESHOLD | COUPLED | DETACHMENT SUBSTITUTION | TERMINATE DISCHARGING |
| g | DISCHARGE SETTING | DISCHARGE THRESHOLD OR GREATER | UNCOUPLED | ATTACHMENT SUBSTITUTION (DISCHARGE) | START DISCHARGING |
| h | DISCHARGE SETTING | DISCHARGE THRESHOLD OR GREATER | COUPLED | NO SUBSTITUTION | DISCHARGING |

ELECTRIC VEHICLE CHARGING MANAGEMENT SYSTEM USING DELIVERY-BASED CONNECTOR ATTACHMENT AND DETACHMENT

CROSS-REFERENCE TO RELATED APPLICATIONS

The present application claims priority from Japanese Patent Application No. 2021-192731 filed on Nov. 29, 2021, the entire contents of which are hereby incorporated by reference.

BACKGROUND

The disclosure relates to a substitution system for providing a substitute to charge or discharge a vehicle.

For example, Japanese Unexamined Patent Application Publication (JP-A) No. 2020-107303 discloses a management system for providing a substitution service to charge an electric vehicle by a substitute. In JP-A No. 2020-107303, a substitute person, who charges an electric vehicle for an orderer, temporarily keeps the electric vehicle of the orderer who orders charging. The substitute person moves the electric vehicle to a charging station and charges the electric vehicle for the orderer.

SUMMARY

An aspect of the disclosure provides a substitution system. The substitution system includes a vehicle, a charge/discharge connector, and a control device. The vehicle includes a vehicle battery and a charging port electrically coupled to the vehicle battery. The charge/discharge connector is configured to be attached to the charging port in a detachable manner and to supply electric power from outside of the vehicle to the vehicle or supply electric power from the vehicle to outside of the vehicle. The control device includes at least one processor and at least one memory coupled to the at least one processor. The at least one processor is configured to perform an operation including, when a delivery person is to deliver an item to a delivery destination, determining whether the vehicle is present at the delivery destination, and in a case where the processor determines that the vehicle is present at the delivery destination, acquiring a state of charge (SOC) of the vehicle battery and coupling condition information indicating whether the charge/discharge connector is coupled to the charging port and determining whether to set attachment substitution or detachment substitution in accordance with the SOC and the coupling condition information; in the attachment substitution, the delivery person who visits the delivery destination to deliver the item attaches the charge/discharge connector to the charging port; in the detachment substitution, the delivery person who visits the delivery destination to deliver the item detaches the charge/discharge connector from the charging port.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 3 presents substitution patterns;

FIG. 9 presents substitution patterns according to an embodiment;

DETAILED DESCRIPTION

In the technique in JP-A No. 2020-107303, the substitute person temporarily keeps the electric vehicle of the orderer and moves the electric vehicle to a charging station, and thus, providing a substitute to charge an electric vehicle with this technique is realized on a large scale. For this reason, orderers might hesitate to order a substitute for charging in daily life and it is not easy for the orderers to use the substitution service.

It is desirable to provide a substitution system that can easily provide a substitute to charge and discharge a vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
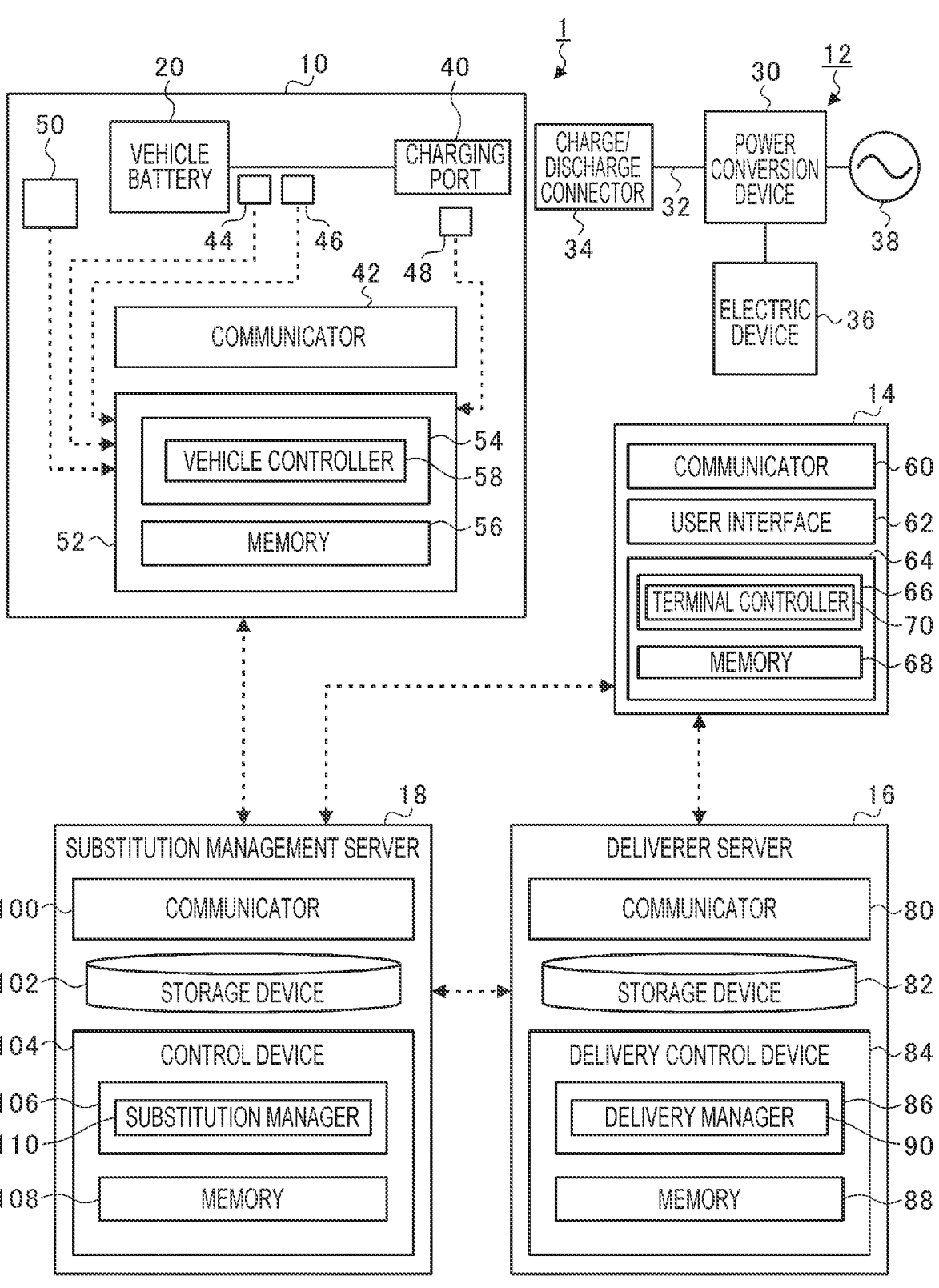
FIG. 1 is a schematic diagram illustrating a configuration of a substitution system according to an embodiment.

FIG. 1 is a schematic diagram illustrating a configuration of a substitution system 1 according to a first embodiment. The substitution system 1 includes a vehicle 10, an out-vehicle electric installation 12, a terminal device 14, a deliverer server 16, and a substitution management server 18.

The vehicle 10 includes a vehicle battery 20 for supplying electric power to an actuator. The vehicle battery 20 may be, for example, a lithium-ion battery; the vehicle battery 20 is a chargeable and dischargeable secondary battery. The vehicle 10 is an electric vehicle or plug-in hybrid electric vehicle (PHEV) that has the vehicle battery 20.

The out-vehicle electric installation 12 includes a power conversion device 30, a cable 32, a charge/discharge connector 34, and an electric device 36. The power conversion device 30 is electrically coupled to an electric power system 38. The electric power system 38 is an example of a power supply provided outside the vehicle 10. Of two ends of the cable 32, a first end is coupled to the power conversion device 30. The charge/discharge connector 34 is provided at a second end of the two ends of the cable 32. As will be described later, the charge/discharge connector 34 can be attached to a charging port 40 of the vehicle 10 in a detachable manner.

The power conversion device 30 converts electric power supplied by the electric power system 38 and supplies the converted electric power to the charge/discharge connector 34 through the cable 32. In the state in which the charge/discharge connector 34 is coupled to the charging port 40, the power conversion device 30 can supply electric power to the vehicle 10 via the charge/discharge connector 34. For example, the power conversion device 30 converts commercial AC power from the electric power system 38 into DC power and supplies the DC power to the vehicle 10. The power conversion device 30 may convert commercial AC power from the electric power system 38 into AC power of a predetermined frequency and supplies the AC power of the predetermined frequency to the vehicle 10. In this case, the vehicle 10 may include a device for converting the supplied AC power into DC power.

The electric device 36 may be, for example, various electrical loads such as lights and electrical appliances that are installed in a building such as a house. The electric device 36 is not necessarily the electrical load described above as an example; the electric device 36 may be, for example, a storage battery for household use. The electric device 36 is electrically coupled to the power conversion device 30. For example, the electric device 36, the power conversion device 30, and the charge/discharge connector 34 are provided at a home of the owner of the vehicle 10.

The electric power system 38 supplies electric power to the electric device 36 via the power conversion device 30. In the state in which the charge/discharge connector 34 is coupled to the charging port 40, the power conversion device 30 can supply electric power from the electric power system 38 to the vehicle 10 via the charge/discharge connector 34 as described above. In the state in which the charge/discharge connector 34 is coupled to the charging port 40, the power conversion device 30 can receive electric power from the vehicle battery 20 of the vehicle 10 via the charge/discharge connector 34. The power conversion device 30 converts the electric power received from the vehicle 10 and supplies the converted electric power to the electric device 36. Additionally, the power conversion device 30 converts the electric power received from the vehicle 10 and supplies the converted electric power to the electric power system 38.

This means that by coupling the charge/discharge connector 34 to the vehicle 10, it is possible to supply electric power from the outside of the vehicle 10 to the vehicle 10 or supply electric power from the vehicle 10 to the outside of the vehicle 10. The vehicle battery 20 is charged with the electric power supplied from the outside of the vehicle 10 to the vehicle 10. The electric power of the vehicle battery 20 is discharged outside the vehicle 10 and also consumed by the electric device 36 or the electric power system 38 outside the vehicle 10.

In this example, the charge/discharge connector 34 serves as both an interface for supplying electric power from the outside of the vehicle 10 to the vehicle 10 and an interface for supplying electric power from the vehicle 10 to the outside of the vehicle 10. However, a charge connector for supplying electric power from the outside of the vehicle 10 to the vehicle 10 and a discharge connector for supplying electric power from the vehicle 10 to the outside of the vehicle 10 may be individually provided. In this case, as for the charging port 40, a charging port corresponding to the charge connector and a charging port corresponding to the discharge connector may be individually provided.

In the following, supplying electric power of the vehicle battery 20 to the outside of the vehicle 10 is expressed as discharging or feeding power when appropriate. Also, charging the vehicle battery 20 with electric power from the outside of the vehicle 10 is expressed as charging the vehicle 10, and discharging electric power from the vehicle battery 20 to the outside of the vehicle 10 is expressed as discharging the vehicle 10, when appropriate. Further, charging the vehicle 10 and discharging the vehicle 10 are collectively expressed as charging and discharging the vehicle 10 when appropriate.

The power conversion device 30 can control switching between charge and discharge of the vehicle 10. The power conversion device 30 may include, for example, a user interface such as an operating unit for controlling switching between charge and discharge of the vehicle 10. The user couples the charge/discharge connector 34 to the vehicle 10 and selects charge or discharge by operating the operating unit.

The power conversion device 30 may communicate with the vehicle 10 via the charge/discharge connector 34 and acquire the state of charge (SOC) of the vehicle battery 20 of the vehicle 10. When the SOC is lower than a preset threshold, the power conversion device 30 may automatically select charge; when the SOC is equal to or higher than the threshold, the power conversion device 30 may automatically select discharge. The threshold is set at, for example, a value that enables determination of whether the present SOC is sufficiently high. The threshold may be set at, for example, 50%. The threshold is not limited to this example value and may be set at any value. When the SOC is lower than the threshold, the probability that charging is necessary is relatively high; when the SOC is equal to or higher than the threshold, the probability that discharging is allowed is relatively high.

The vehicle 10 includes, as well as the vehicle battery 20, the charging port 40, a communicator 42, a voltage sensor 44, a current sensor 46, a coupling sensor 48, a navigation device 50, and a vehicle control device 52.

The charging port 40 can be coupled to the charge/discharge connector 34. The charging port 40 is electrically coupled to the vehicle battery 20. When the charge/discharge connector 34 is coupled to the charging port 40, the vehicle battery 20 is electrically coupled to the power conversion device 30 via the charging port 40 and the charge/discharge connector 34. As a result, as described above, supplying electric power from the power conversion device 30 to the vehicle battery 20 and supplying electric power from the vehicle battery 20 to the power conversion device 30 are enabled.

The communicator 42 can establish communication with the substitution management server 18 through a communication network such as the Internet or a mobile network. The communicator 42 may be configured to communicate with the terminal device 14.

The voltage sensor 44 senses the voltage at an input/output terminal of the vehicle battery 20. The current sensor 46 senses the current at the input/output terminal of the vehicle battery 20. The coupling sensor 48 detects attachment of the charge/discharge connector 34 to the charging port 40 or detachment of the charge/discharge connector 34 from the charging port 40. The coupling sensor 48 outputs to the vehicle control device 52 a coupling flag indicating whether the charge/discharge connector 34 is coupled to the charging port 40.

The navigation device 50 can acquire vehicle location information using, for example, the global positioning system (GPS). The navigation device 50 can also acquire road information indicating road congestion conditions and weather information indicating the weather at the location of the vehicle.

The vehicle control device 52 includes at least one processor 54 and at least one memory 56 coupled to the processor 54. The memory 56 includes a read-only memory (ROM) storing, for example, programs and a random-access memory (RAM) serving as a work area. The processor 54 of the vehicle control device 52 serves as a vehicle controller 58 and provides overall control of the vehicle 10 by running the programs stored in the memory 56.

For example, the vehicle controller 58 calculates the SOC of the vehicle battery 20 in accordance with the voltage sensed by the voltage sensor 44. The vehicle controller 58 calculates the charging current supplied from the outside of the vehicle 10 to the vehicle battery 20 in accordance with the current sensed by the current sensor 46. The vehicle controller 58 receives the coupling flag from the coupling sensor 48 and manages the coupling flag. The vehicle controller 58 can acquire the vehicle location information, the road information, and the weather information from the navigation device 50.

The terminal device 14 is an electronic device such as a smartphone, tablet computer, or personal computer. The terminal device 14 may be a portable or non-portable electronic device. It is assumed that the terminal device 14 is owned by, for example, the owner of the vehicle 10, and the user of the terminal device 14 is the owner of the vehicle 10. The terminal device 14 includes a communicator 60, a user interface 62, and a terminal control device 64.

The communicator 60 can establish communication with the substitution management server 18 or the deliverer server 16 through a communication network such as the Internet or a mobile network. The communicator 60 may be configured to communicate with the vehicle 10.

The user interface 62 includes, for example, an output device for providing various kinds of information for the user such as a display and an input device for receiving input operations by the user such as a touch panel.

The terminal control device 64 includes at least one processor 66 and at least one memory 68 coupled to the processor 66. The memory 68 includes a ROM storing, for example, programs and a RAM serving as a work area. The processor 66 of the terminal control device 64 serves as a terminal controller 70 and provides overall control of the terminal device 14 by running the programs stored in the memory 68.

For example, the terminal controller 70 establishes communication connection with the deliverer server 16 via the communicator 60 in accordance with input operations by the user. As will be described later, the deliverer server 16 may be managed by, for example, a service provider operating an online shopping site. The terminal controller 70 can perform an operation for ordering items on sale at the online shopping site in accordance with input operations by the user.

The owner of the vehicle 10 can charge or discharge the vehicle 10 by coupling the charge/discharge connector 34 to the charging port 40. The owner of the vehicle 10 might feel that such charge or discharge operation is a laborious task.

To deliver an item, a delivery person of a deliverer delivering the item can visit a building of a delivery destination of the item. Examples of the deliverer include a service provider delivering items ordered on, for example, online shopping sites to orderers' homes or other location. The deliverer is not limited to this example and may be any kinds of deliverer delivering various items such as a newspaper deliverer or meal delivery service provider. When the owner of the vehicle 10 orders an item, a delivery person of the deliverer can visit the home of the owner of the vehicle 10, who is the orderer of the item.

With the substitution system 1 of the present embodiment, when the delivery person of the deliverer as described above visits the home of the owner of the vehicle 10 to deliver an item, the delivery person attaches the charge/discharge connector 34 to the charging port 40 for the owner of the vehicle 10. As the result of attaching the charge/discharge connector 34 to the charging port 40, charging or discharging the vehicle 10 is carried out. Conversely, with the substitution system 1 of the present embodiment, when the delivery person visits the home of the owner of the vehicle 10 to deliver an item, the delivery person detaches the charge/discharge connector 34 from the charging port 40 for the owner of the vehicle 10.

In the following, the operation in which the delivery person attaches the charge/discharge connector 34 to the charging port 40 for the owner of the vehicle 10 is referred to as attachment substitution when appropriate. Also, the operation in which the delivery person detaches the charge/discharge connector 34 from the charging port 40 for the owner of the vehicle 10 is referred to as detachment substitution when appropriate. Attaching the charge/discharge connector 34 to the charging port 40 and detaching the charge/discharge connector 34 from the charging port 40 are collectively expressed as attachment/detachment of the charge/discharge connector 34 when appropriate. The term "substitution" in the present embodiment denotes performing any operation for the owner of the vehicle 10.

For example, when the owner of the vehicle 10 orders an item, in consideration of the delivery time of the item, the owner performs an input operation indicating whether the owner desires a substitution service for attachment/detachment of the charge/discharge connector 34 by a delivery person. The input operation indicating whether the owner desires the substitution service is not necessarily performed when the owner orders an item, and may be performed at, for example, any timing before the item is delivered. Alternatively, for example, when a fixed-term contract such as a contract for newspaper delivery is made, the owner may decide whether the owner desires the substitution service at the same time. The owner may also change appropriately the decision of whether the owner desires the substitution service, for example, when the contract is renewed.

Figure 2:
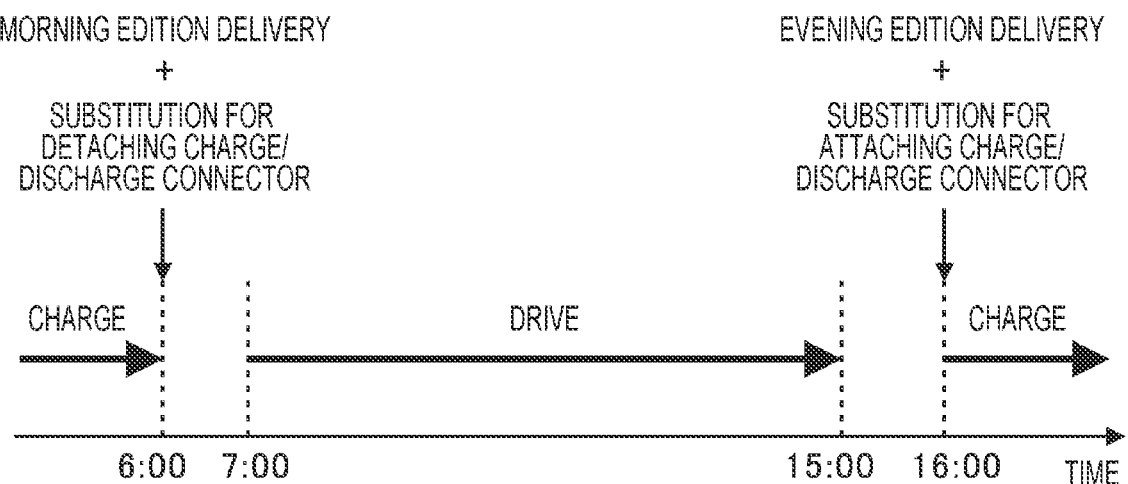
FIG. 2 illustrates an example of a substitution service for attachment/detachment of a charge/discharge connector by a deliverer.

FIG. 2 illustrates an example of a substitution service for attachment/detachment of the charge/discharge connector 34 by a deliverer. In the example in FIG. 2, the deliverer is a newspaper deliverer. As illustrated in FIG. 2, it is assumed that the owner of the vehicle 10 keeps the vehicle 10 away from home between 7:00 and 15:00 and parks the vehicle 10 at home at 15:00.

It is also assumed that a delivery person of newspaper delivery delivers the evening edition of the paper to the home of the owner of the vehicle 10 at 16:00. At this time, as well as delivering the evening edition of the paper, the delivery person carries out attachment substitution of attaching the charge/discharge connector 34 to the charging port 40 of the vehicle 10. At this time, as well as attaching the charge/discharge connector 34, the delivery person may perform an input operation for selecting charge from charge and discharge on the power conversion device 30. Instead of the delivery person performing the input operation for selecting charge, the power conversion device 30 may automatically select charge based on the SOC of the vehicle 10. As a result, the vehicle 10 is charged during night.

It is assumed that charge of the vehicle 10 is performed during night and completed by 6:00 in the morning. It is also assumed that a delivery person of newspaper delivery delivers the morning edition of the paper to the home of the owner of the vehicle 10 at 6:00. At this time, as well as delivering the morning edition of the paper, the delivery person carries out detachment substitution of detaching the charge/discharge connector 34 from the charging port 40 of the vehicle 10. As a result, the charge/discharge connector 34 is detached before 7:00 at which the owner of the vehicle 10 moves the vehicle 10 out of the home.

As such, because the delivery person of the deliverer carries out attachment/detachment of the charge/discharge connector 34 for the owner of the vehicle 10, it is possible to ease the laborious task in which the owner of the vehicle 10 carries out attachment/detachment of the charge/discharge connector 34, in other words, charging and discharging the vehicle 10. Moreover, because the delivery person carries out attachment/detachment of the charge/discharge connector 34 as a substitute together with delivery of an item, providing a substitute to charge and discharge the vehicle 10 is easier than, for example, a service especially for charging and discharging the vehicle 10 as a substitute. Further, it is unnecessary to leave the vehicle 10 with a service provider to charge and discharge the vehicle 10 as a substitute, and thus, the owner of the vehicle 10 can readily request a substitute to charge and discharge the vehicle 10.

The following describes a configuration of the deliverer server 16 and a configuration of the substitution management server 18 that implement such a substitution service, followed by the description of an operational flow regarding the substitution system 1.

Referring back to FIG. 1, the deliverer server 16 is a server managed by a deliverer who provides a service of item delivery. In addition to providing the service of item delivery, the deliverer may, for example, operate an online shopping site. For example, the deliverer server 16 manages the online shopping site and also manages delivery of items ordered on the online shopping site to specific delivery destinations.

The deliverer server 16 includes a communicator 80, a storage device 82, and a delivery control device 84. The communicator 80 can establish communication with the terminal device 14 and the substitution management server 18 through a communication network such as the Internet or a mobile network.

The storage device 82 is implemented by a non-volatile storage cell. The storage device 82 stores various kinds of information about delivery. The storage device 82 stores, for example, information identifying an item orderer, information identifying the vehicle 10 owned by the item orderer, and location information of a delivery destination.

The delivery control device 84 includes at least one processor 86 and at least one memory 88 coupled to the processor 86. The memory 88 includes a ROM storing, for example, programs and a RAM serving as a work area. The processor 86 of the delivery control device 84 provides overall control of the deliverer server 16 by running the programs stored in the memory 88. The processor 86 of the delivery control device 84 also serves as a delivery manager 90 by running a program. The delivery manager 90 performs operations relating to item delivery.

For example, when a delivery departure time, which indicates a time at which a delivery person departs for a delivery destination, arrives, the delivery manager 90 transmits information indicating the occurrence of this event to the substitution management server 18. In response to receiving this information, the substitution management server 18 determines whether attachment substitution or detachment substitution is set and transmits the determination result to the deliverer server 16. The delivery manager 90 transmits the received determination result to a delivery terminal device carried by a delivery person who is to provide delivery. As a result, the delivery person can deliver an item and also can carry out attachment/detachment of the charge/discharge connector 34 as a substitute at the delivery destination.

The substitution management server 18 is a server for managing a substitution service to charge and discharge the vehicle 10. The substitution management server 18 includes a communicator 100, a storage device 102, and a control device 104.

The communicator 100 can establish communication with the vehicle 10 and the deliverer server 16 through a communication network such as the Internet or a mobile network. The communicator 100 may be configured to communicate with the terminal device 14.

The storage device 102 is implemented by a non-volatile storage cell. The storage device 102 stores various kinds of information about management of the substitution service. The storage device 102 stores, for example, usage setting information regarding usage of the substitution service such as information indicating whether the usage of the substitution service for charging and discharging the vehicle 10 is desired. The usage setting information may include charge setting information indicating that charge substitution is desired out of charge and discharge of the vehicle 10 or discharge setting information indicating that discharge substitution is desired out of charge and discharge of the vehicle 10.

The control device 104 includes at least one processor 106 and at least one memory 108 coupled to the processor 106. The memory 108 includes a ROM storing, for example, programs and a RAM serving as a work area. The processor 106 of the control device 104 provides overall control of the substitution management server 18 by running the programs stored in the memory 108. The processor 106 of the control device 104 also serves as a substitution manager 110 by running a program. The substitution manager 110 provides management regarding whether a deliverer is requested to carry out attachment/detachment of the charge/discharge connector 34 as a substitute and management of request details.

For example, when a delivery person is to deliver an item to a delivery destination, the substitution manager 110 determines whether the vehicle 10 is present at the delivery destination. Here, the vehicle 10 is owned by the user using the substitution service, and the vehicle 10 is also identified when the item to be delivered is ordered. The substitution manager 110 acquires location information of the delivery destination from the deliverer server 16. The substitution manager 110 communicates with the vehicle 10 and acquires from the vehicle 10 present location information of the vehicle 10. When the location information of the delivery destination is substantially the same as the location information of the vehicle 10 within a predetermined allowable range of error, the substitution manager 110 determines that the vehicle 10 is present at the delivery destination.

When the substitution manager 110 determines that the vehicle 10 is present at the delivery destination, the substitution manager 110 acquires from the vehicle 10 via the communicator 100 the present SOC of the vehicle battery 20 of the vehicle 10 and present coupling condition information. The coupling condition information indicates whether the charge/discharge connector 34 is coupled to the charging port 40 of the vehicle 10. Based on the SOC and the coupling condition information, the substitution manager 110 determines which of the following operations is to be set: attachment substitution in which the delivery person visiting the delivery destination to deliver an item attaches the charge/discharge connector 34 to the charging port 40; or detachment substitution in which the delivery person visiting the delivery destination to deliver an item detaches the charge/discharge connector 34 from the charging port 40.

When the SOC is lower than a predetermined threshold, and the coupling condition information indicates that the charge/discharge connector 34 is not coupled to the charging port 40, the substitution manager 110 sets attachment substitution. As a result, the owner of the vehicle 10 requests the deliverer to provide the attachment substitution. When the SOC is equal to or higher than the predetermined threshold, and the coupling condition information indicates that the charge/discharge connector 34 is coupled to the charging port 40, the substitution manager 110 sets detachment substitution. As a result, the owner of the vehicle 10 requests the deliverer to provide the detachment substitution.

In the following, the state in which the charge/discharge connector 34 is coupled to the charging port 40 is expressed as coupled, and the state in which the charge/discharge connector 34 is not coupled to the charging port 40 is expressed as uncoupled, when appropriate.

Additionally, when the SOC is lower than the predetermined threshold, and the coupling condition information indicates that the charge/discharge connector 34 is coupled to the charging port 40, the substitution manager 110 estimates a charge completion time at which charge of the vehicle 10 is to be completed. The substitution manager 110 determines whether the charge completion time is later than a designated delivery time that is a delivery time designated by the item orderer. When the charge completion time is later than the designated delivery time, the substitution manager 110 changes the designated delivery time to a time equal to or later than the charge completion time and sets detachment substitution. As a result, the delivery person visits the delivery destination in accordance with the changed designated delivery time, and at this timing, the delivery person detaches the charge/discharge connector 34 from the charging port 40 of the vehicle 10.

When the charge completion time is later than the designated delivery time, the substitution manager 110 may determine whether the item delivery time is changeable. When the substitution manager 110 determines that the item delivery time is changeable, the substitution manager 110 changes the designated delivery time to a time equal to or later than the charge completion time and sets detachment substitution. By contrast, when the substitution manager 110 determines that the item delivery time is unchangeable, the substitution manager 110 does not change the delivery time and does not set attachment substitution or detachment substitution.

FIG. 3 presents substitution patterns. In FIG. 3, SOC, coupling condition information, charge/discharge setting, substitution detail, and status are associated with each other. SOC and coupling condition information indicate the SOC and coupling condition information when the substitution detail is determined. The threshold is set at a value that enables determination of whether the SOC is sufficiently high. The threshold may be set at, for example, 50%. The threshold is not limited to this example value and may be set at any value. When the SOC is lower than the threshold, the probability that charging is to be performed is relatively high; when the SOC is equal to or higher than the threshold, the probability that discharging is allowed is relatively high. Charge/discharge setting indicates whether charge setting or discharge setting is set. Status indicates an example of charge or discharge condition.

As indicated in pattern A in FIG. 3, when the SOC is lower than the threshold, the coupling condition information indicates uncoupled, and charge setting is configured, the substitution manager 110 determines to set attachment substitution. In this case, as the result of attaching the charge/discharge connector 34 to the charging port 40, charging starts.

As indicated in pattern B in FIG. 3, when the SOC is lower than the threshold, the coupling condition information indicates uncoupled, and discharge setting is configured, the substitution manager 110 determines not to set substitution of attachment/detachment of the charge/discharge connector 34. This means that, in this case, when the delivery person visits the delivery destination to deliver an item, the delivery person neither attaches the charge/discharge connector 34 to the charging port 40 nor detaches the charge/discharge connector 34 from the charging port 40. Because attachment/detachment of the charge/discharge connector 34 is not carried out, discharge of the vehicle battery 20 to the outside of the vehicle 10 is not performed.

As indicated in pattern C in FIG. 3, when the SOC is lower than the threshold, the coupling condition information indicates coupled, and charge setting is configured, it can be assumed that charging is ongoing, and thus, the substitution manager 110 determines not to set substitution of attachment/detachment of the charge/discharge connector 34. In the case where the SOC is lower than the threshold, the coupling condition information indicates coupled, and charge setting is configured, when the delivery time is changeable, the substitution manager 110 changes the designated delivery time. As the result of changing the designated delivery time, the delivery person is due to visit the delivery destination after completion of charging, and thus, the substitution manager 110 determines to set detachment substitution.

As indicated in pattern D in FIG. 3, when the SOC is lower than the threshold, the coupling condition information indicates coupled, and discharge setting is configured, it can be assumed that discharging has been completed, and thus, the substitution manager 110 determines to set detachment substitution.

As indicated in pattern E in FIG. 3, when the SOC is equal to or higher than the threshold, the coupling condition information indicates uncoupled, and charge setting is configured, the substitution manager 110 determines not to set substitution of attachment/detachment of the charge/discharge connector 34. Because attachment/detachment of the charge/discharge connector 34 is not carried out, charge of the vehicle battery 20 from the outside of the vehicle 10 is not performed.

As indicated in pattern F in FIG. 3, when the SOC is equal to or higher than the threshold, the coupling condition information indicates uncoupled, and discharge setting is configured, the substitution manager 110 determines to set attachment substitution. In this case, as the result of attaching the charge/discharge connector 34 to the charging port 40, discharging starts.

As indicated in pattern G in FIG. 3, when the SOC is equal to or higher than the threshold, the coupling condition information indicates coupled, and charge setting is configured, it can be assumed that charging has been completed, and thus, the substitution manager 110 determines to set detachment substitution.

As indicated in pattern H in FIG. 3, when the SOC is equal to or higher than the threshold, the coupling condition information indicates coupled, and discharge setting is configured, it can be assumed that discharging is ongoing, and thus, the substitution manager 110 determines not to set substitution of attachment/detachment of the charge/discharge connector 34.

As such, details of substitution detail can be determined based on the conditions of SOC, coupling condition information, and charge/discharge setting. When charge/discharge setting is not configured, the substitution manager 110 may determine not to set substitution.

The following describes operational flows of the substitution system 1 with reference to FIGS. 4 to 8. The following description uses the example in which a deliverer operates an online shopping site and also delivers an item ordered at the online shopping site to a delivery destination designated by an orderer ordering the item. The orderer of the item uses a substitution service for charging or discharging the vehicle 10 owned by the orderer. The delivery person of the deliverer carries out attachment/detachment of the charge/discharge connector 34 of the vehicle 10 of the orderer for the orderer in accordance with the substitution service.

Figure 4:
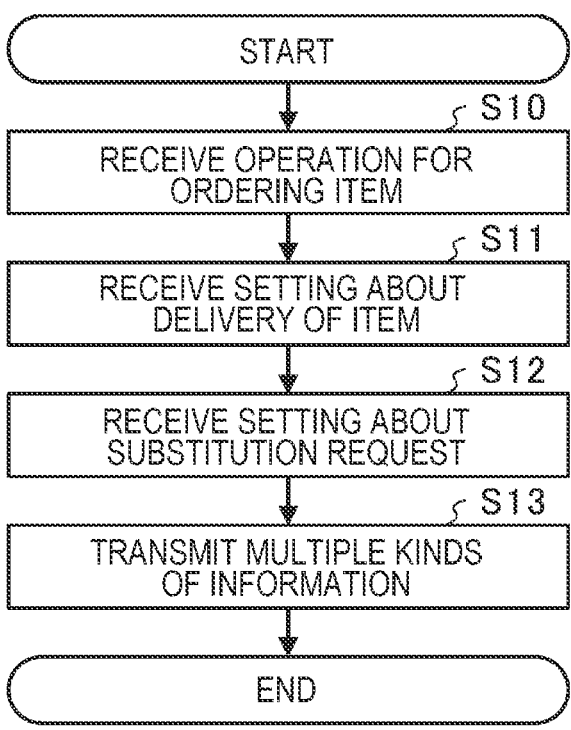
FIG. 4 is a flowchart illustrating an operational flow of a terminal device when an item is ordered.

FIG. 4 is a flowchart illustrating an operational flow of the terminal device 14 when an item is ordered. The user operates the terminal device 14 owned by the user and accesses the online shopping site of the deliverer. When communication with the deliverer server 16 is established, the terminal device 14 displays a particular page of the online shopping site of the deliverer on a display.

The terminal controller 70 of the terminal device 14 receives an operation for ordering an item by the user at the online shopping site (S10). As a result, the terminal controller 70 can acquire item information, which is information about the item. The item information may include, for example, the type of the item and the size of a packing material for packing the item.

Next, the terminal controller 70 receives an operation for configuring a setting about delivery of the item (S11). As a result, the terminal controller 70 can acquire delivery information, which is information about delivery. The delivery information may include, for example, information specifying the orderer of the item or a recipient of the item, a delivery destination of the item, and a designated delivery time. The designated delivery time is a delivery time designated by the orderer of the item.

Next, the terminal controller 70 receives an operation for configuring a setting about a substitution request (S12). As a result, the terminal controller 70 can acquire substitution setting information, which is information about the setting of a substitution request. The substitution setting information includes, for example, information about whether a substitute to carry out attachment/detachment of the charge/discharge connector 34 is desired. The substitution setting information may include information identifying the vehicle 10 for which attachment/detachment of the charge/discharge connector 34 is to be carried out. The substitution setting information may include charge setting information indicating that charging is desired out of charging and discharging or discharge setting information indicating that discharging is desired out of charging and discharging. This means that the user can indicate the user desires a substitute to carry out attachment/detachment of the charge/discharge connector 34 to charge the vehicle 10 or the user desires a substitute to carry out attachment/detachment of the charge/discharge connector 34 to discharge the vehicle 10.

Next, the terminal controller 70 transmits multiple kinds of information including item information, delivery information, and substitution setting information to the deliverer server 16 (S13). When the deliverer server 16 receives the multiple kinds of information, the deliverer server 16 stores the received pieces of information in the storage device 82 and makes arrangements for the item. The terminal controller 70 may transmit also to the substitution management server 18 part or all of the information transmitted to the deliverer server 16.

Figure 5:
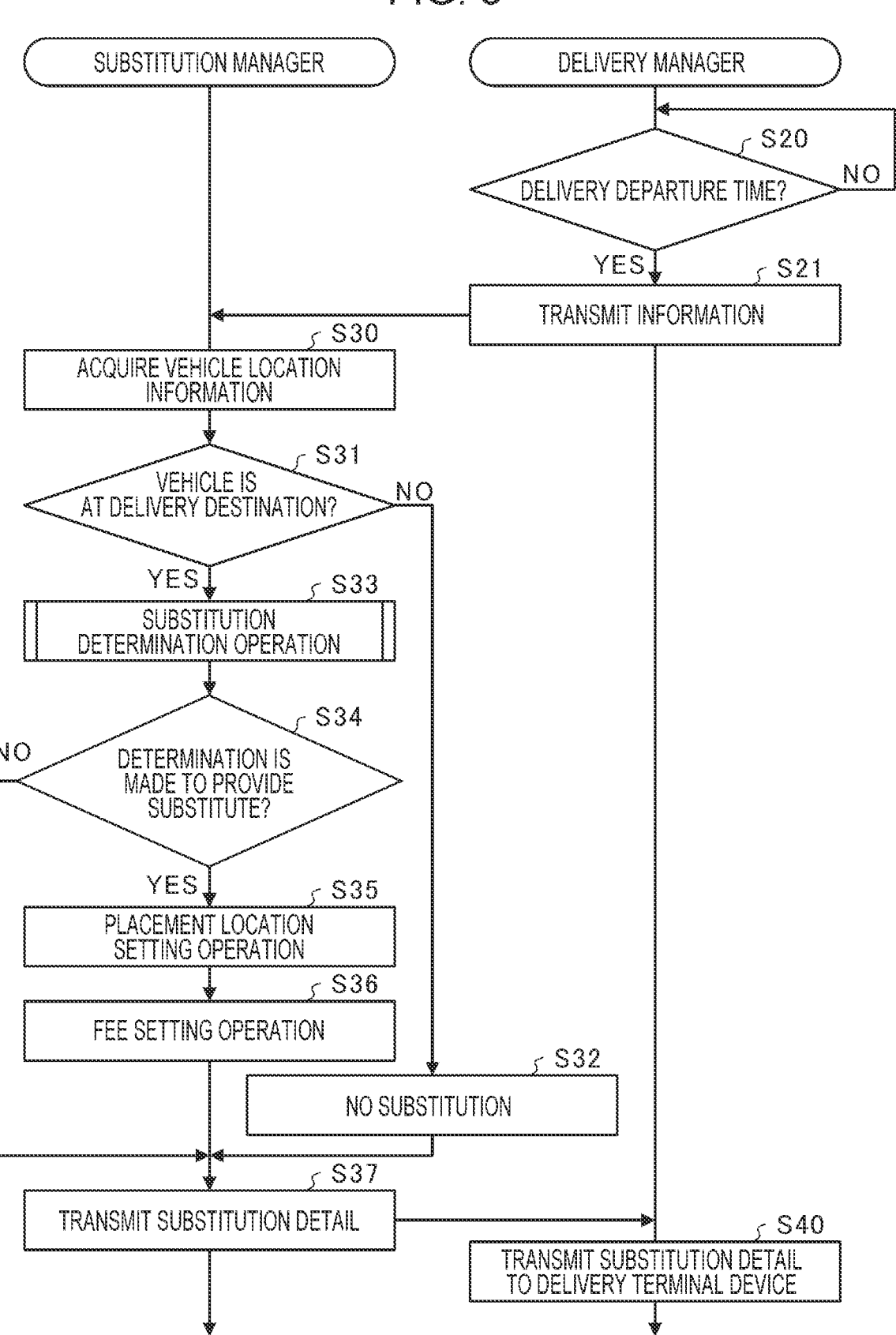
FIG. 5 is a sequence diagram illustrating an operational flow of a delivery manager and a substitution manager to deliver an item.

FIG. 5 is a sequence diagram illustrating an operational flow of the delivery manager 90 and the substitution manager 110 to deliver an item.

The delivery manager 90 of the deliverer server 16 determines whether the present time reaches the delivery departure time that indicates a time when the delivery person is due to depart for the delivery destination (S20). The delivery departure time may be set based on, for example, a time length taken for delivery that is estimated based on the location where delivery of the item departs and the location of the delivery destination, and the designated delivery time. When the present time has not reached the delivery departure time (NO in S20), the delivery manager 90 waits until the present time reaches the delivery departure time.

When the present time reaches the delivery departure time (YES in S20), the delivery manager 90 transmits to the substitution management server 18 information indicating that the delivery departure time has arrived (S21). At this time, the delivery manager 90 may transmit the item information, the delivery information, and the substitution setting information to the substitution management server 18.

When the substitution manager 110 of the substitution management server 18 receives the multiple kinds of information from the deliverer server 16, the substitution manager 110 of the substitution management server 18 acquires location information of the vehicle 10 from the vehicle 10 identified according to the information identifying the vehicle 10, included in the substitution setting information (S30). For example, the substitution manager 110 communicates with the identified vehicle 10 and submits to the vehicle 10 a request for transmitting present location information. The vehicle 10 acquires present location information using, for example, the GPS of the navigation device 50 and transmits the acquired location information to the substitution management server 18. As such, the substitution manager 110 can acquire present location information of the vehicle 10.

Next, the substitution manager 110 determines whether the vehicle 10 is present at the delivery destination (S31). When the acquired present location information of the vehicle 10 is substantially the same as the location information of the delivery destination within a predetermined allowable range of error, the substitution manager 110 determines that the vehicle 10 is present at the delivery destination.

When it is determined that the vehicle 10 is not present at the delivery destination (NO in S31), the substitution manager 110 determines not to set substitution (S32) and proceeds to step S37.

When it is determined that the vehicle 10 is present at the delivery destination (YES in S31), the substitution manager 110 performs a substitution determination operation (S33). The substitution determination operation is an operation of determining whether to provide a substitute in accordance with the SOC and coupling condition information. The substitution determination operation will be described in detail later.

After the substitution determination operation, the substitution manager 110 determines whether a substitute is determined to be provided in the substitution determination operation (S34). When a substitute is determined to be not provided in the substitution determination operation (NO in S34), the substitution manager 110 proceeds to step S37.

When a substitute is determined to be provided in the substitution determination operation (YES in S34), the substitution manager 110 performs an operation of setting a placement location of the item (S35). For example, the item information received from the deliverer server 16 includes size information of a packing material for packing the item. The substitution manager 110 refers to the size information and determines whether the item can be contained in a mailbox. When the substitution manager 110 determines that the item can be contained in the mailbox, the substitution manager 110 configures a placement location setting to place the item in the mailbox.

The information identifying the vehicle 10, acquired from the deliverer server 16, includes rooftop tent information indicating whether a rooftop tent is present near the vehicle 10. When the substitution manager 110 determines that the item cannot be contained in the mailbox, and a rooftop tent is present near the vehicle 10, the substitution manager 110 configures a placement location setting to place the item in the rooftop tent.

When a substitution request is accepted and the delivery person serves as a substitute, the delivery person comes close to the vehicle 10. Hence, by placing the item in the rooftop tent near the vehicle 10, the delivery person can efficiently carry out both the operation of delivering the item and the operation of substitution of attachment/detachment of the charge/discharge connector 34.

When the substitution manager 110 determines that the item cannot be contained in the mailbox, and a rooftop tent is not present near the vehicle 10, the substitution manager 110 may configure a setting to, for example, hand the item directly to the recipient.

Next, the substitution manager 110 performs an operation of setting a substitution fee for providing a substitute (S36) and proceeds to step S37. The substitution manager 110 may set the substitution fee in consideration of busyness of the deliverer, weather, road congestion conditions, or other condition.

For example, the delivery manager 90 generates busyness information indicating a busyness level out of multiple busyness levels, based on the number of delivery people who are providing delivery, the number of delivery people on standby, the number of delivery cases to be delivered, or other kind of information. The substitution manager 110 may acquire the busyness information from the deliverer server 16 and configure a setting such that the higher the busyness level indicated by the busyness information is, the higher the substitution fee is.

The substitution manager 110 estimates a delivery route based on the location where delivery departs and the location of the delivery destination. The substitution manager 110 transmits information about the delivery route to the vehicle 10. The vehicle controller 58 acquires road information indicating road congestion conditions in the delivery route and weather information indicating the weather in the delivery route by using the navigation device 50 and transmits these kinds of information to the substitution management server 18. The substitution manager 110 may refer to the road information and configure a setting such that the more heavily roads are congested, the higher the substitution fee is. Further, the substitution manager 110 may refer to the weather information and configure a setting such that the worse the weather is (for example, when it is rainy), the higher the substitution fee is.

In step S37, the substitution manager 110 transmits substitution detail to the deliverer server 16 (S37). The substitution detail includes, for example, information indicating whether a substitute is provided. When a substitute is provided, the substitution detail may include information indicating that attachment substitution for charging, attachment substitution for discharging, or detachment substitution is to be performed. When a substitute is provided, the substitution detail may include setting information of the placement location of the item and information indicating the substitution fee.

When the delivery manager 90 of the deliverer server 16 receives the substitution detail, the delivery manager 90 of the deliverer server 16 transmits the substitution detail to a delivery terminal device carried by the delivery person providing delivery (S40). When the delivery terminal device receives the substitution detail, the delivery terminal device notifies the delivery person of the substitution detail by, for example, displaying the substitution detail on a display. As a result, the delivery person providing delivery can understand the substitution detail.

Figure 6:
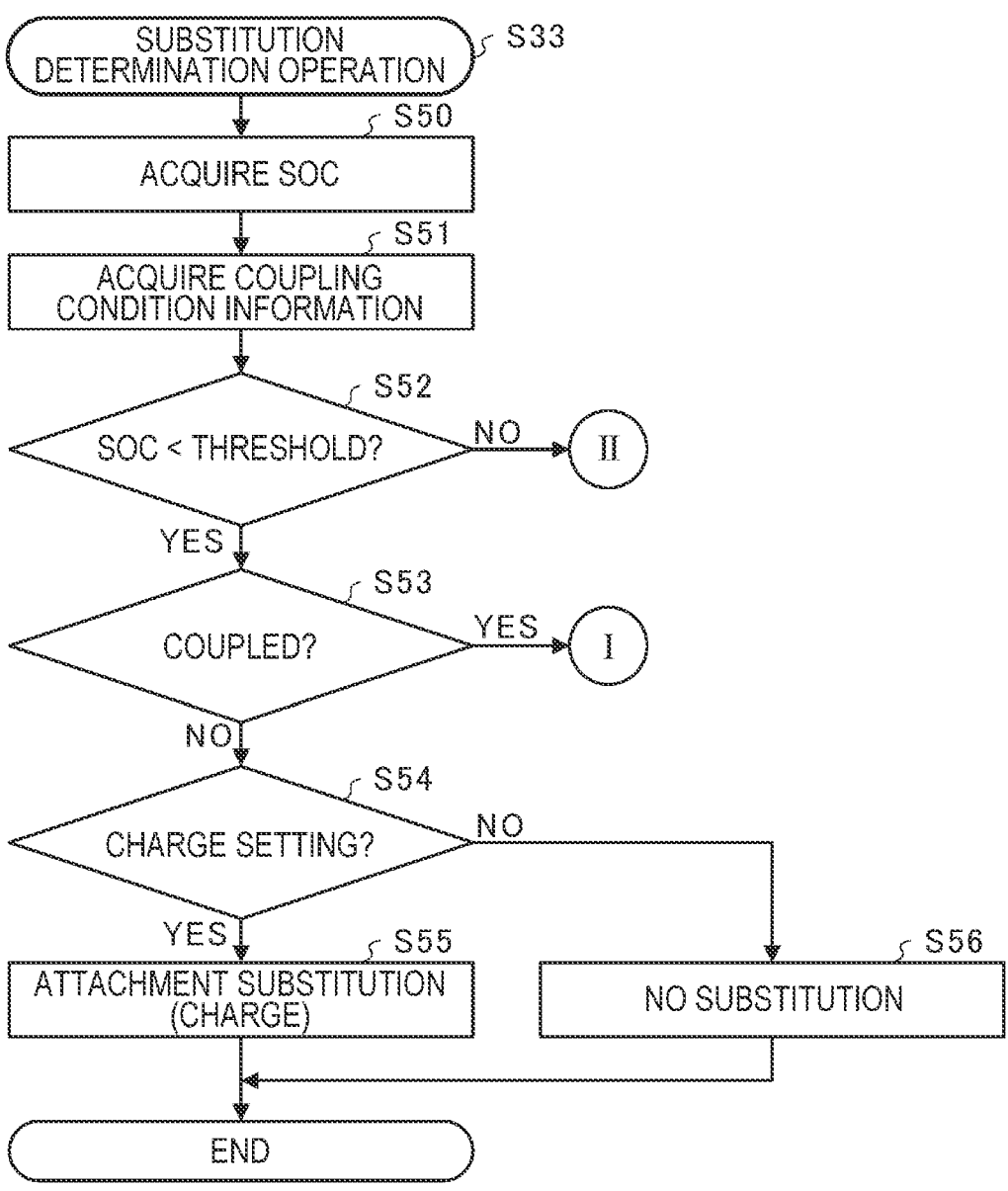
FIG. 6 provides a flowchart illustrating a flow of a substitution determination operation.
Figure 7:
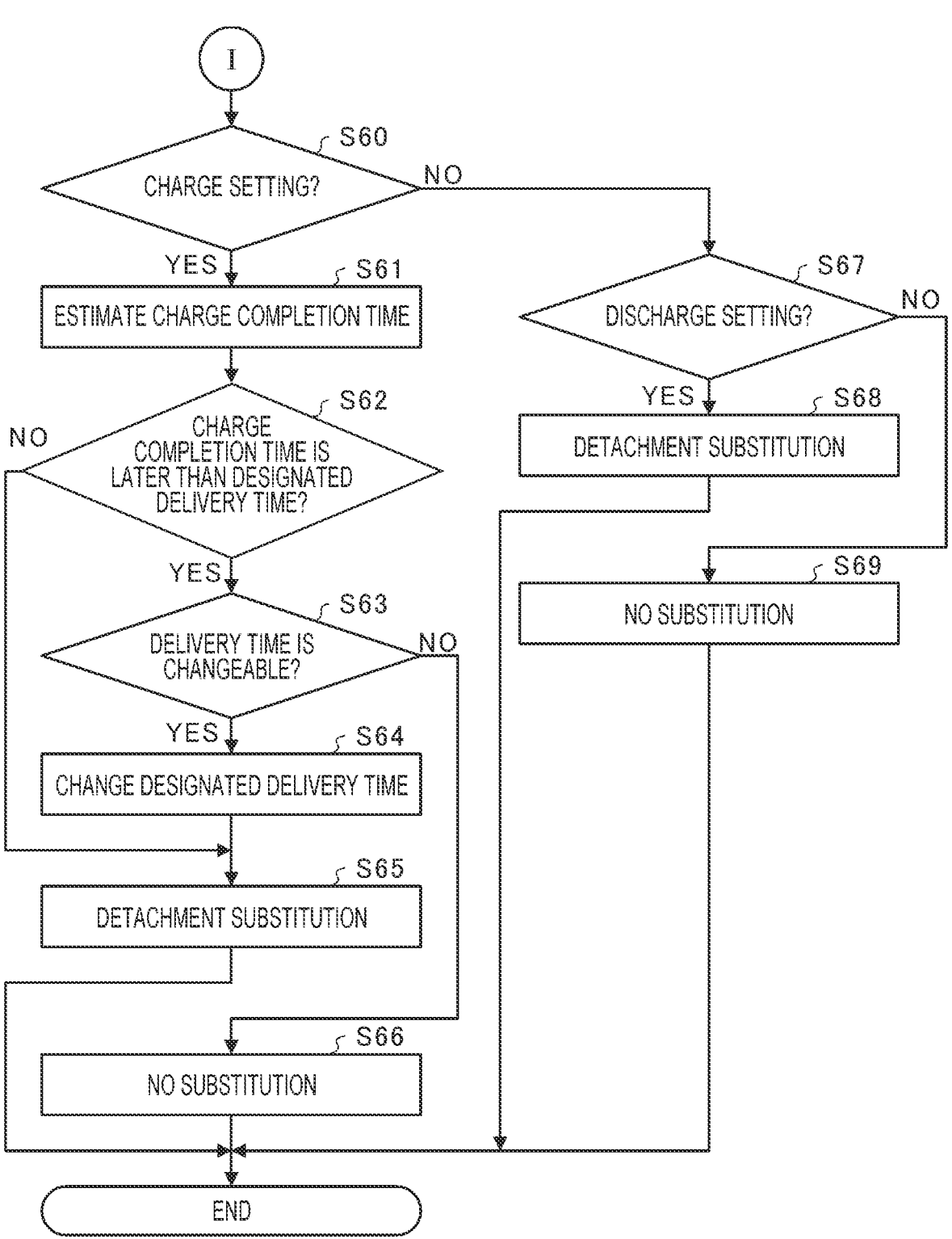
FIG. 7 provides a flowchart illustrating the flow of the substitution determination operation.
Figure 8:
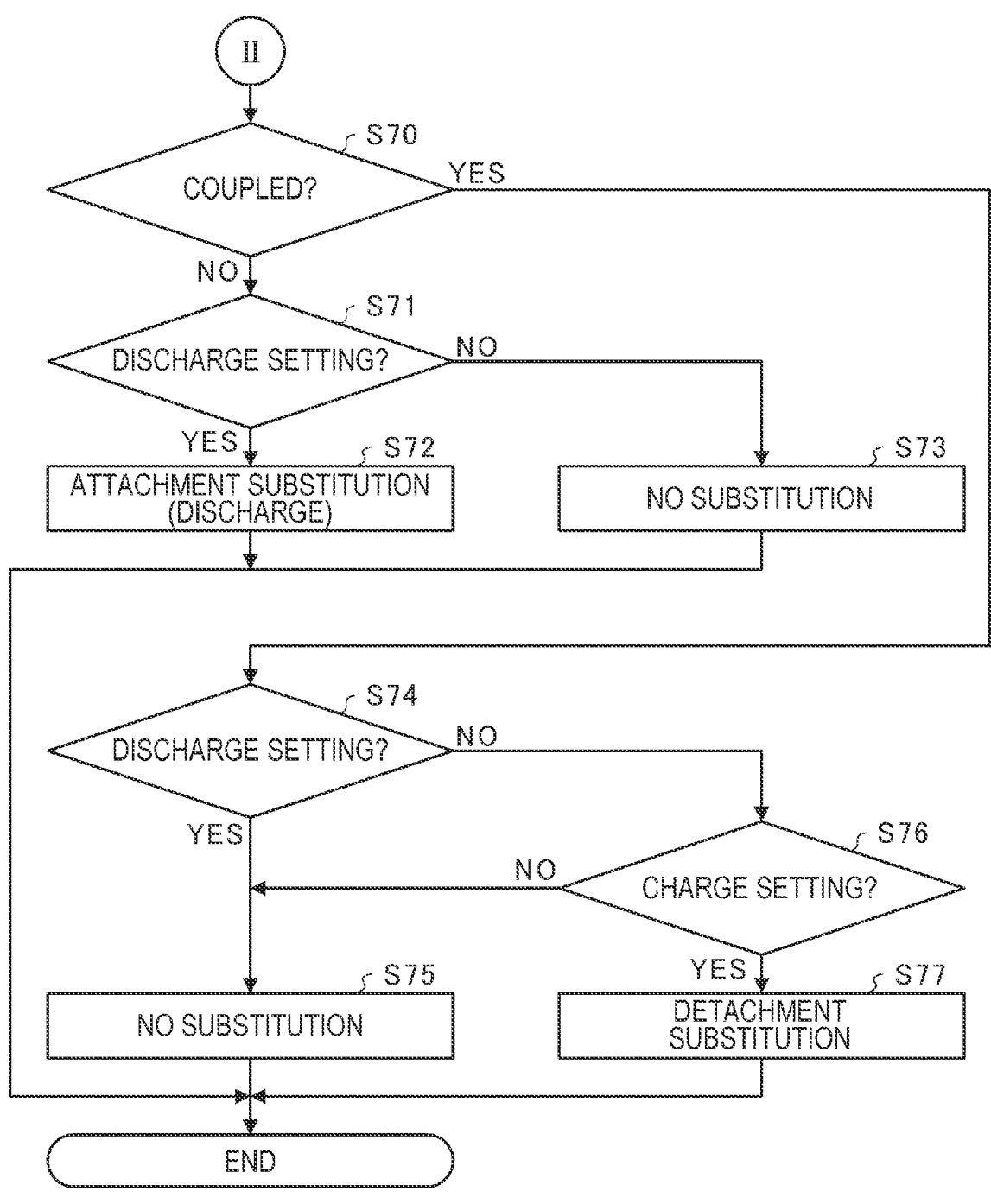
FIG. 8 provides a flowchart illustrating the flow of the substitution determination operation.

FIGS. 6, 7, and 8 provide a flowchart illustrating a flow of the substitution determination operation (S33). "I" in FIG. 6 is connected to "I" in FIG. 7. "II" in FIG. 6 is connected to "II" in FIG. 8.

As illustrated in FIG. 6, when the substitution determination operation starts, the substitution manager 110 acquires from the vehicle 10 determined to be present at the delivery destination the present SOC of the vehicle battery 20 of the vehicle 10 (S50). For example, the substitution manager 110 transmits a request for transmitting the SOC to the vehicle 10. The vehicle controller 58 of the vehicle 10 calculates the present SOC in accordance with the voltage sensed by the voltage sensor 44 and transmits the calculated SOC to the substitution management server 18. As a result, the substitution manager 110 can acquire the present SOC.

Next, the substitution manager 110 acquires the present coupling condition information from the vehicle 10 (S51). For example, the substitution manager 110 transmits a request for transmitting the coupling condition information to the vehicle 10. The vehicle controller 58 of the vehicle 10 acquires the present coupling condition information in accordance with the coupling flag from the coupling sensor 48 and transmits the acquired coupling condition information to the substitution management server 18. As a result, the substitution manager 110 can acquire the present coupling condition information.

Next, the substitution manager 110 determines whether the present SOC acquired from the vehicle 10 is lower than a predetermined threshold (S52). The predetermined threshold is set at a value that enables determination of whether the present SOC is sufficiently high. The predetermined threshold may be set at, for example, 50%. The predetermined threshold is not limited to this example value and may be set at any value.

When the present SOC is lower than the predetermined threshold (YES in S52), the substitution manager 110 determines whether the acquired present coupling condition information indicates coupled (S53).

When the present coupling condition information does not indicate coupled, in other words, the present coupling condition information indicates uncoupled (NO in S53), the substitution manager 110 determines whether charge setting is configured in the substitution setting information (S54).

When charge setting is configured (YES in S54), the substitution manager 110 determines to set attachment substitution for charging (S55) and ends the substitution determination operation.

When charge setting is not configured (NO in S54), the substitution manager 110 determines not to set substitution (S56) and ends the substitution determination operation.

In step S53, when the present coupling condition information indicates coupled (YES in S53), the substitution manager 110 moves from "I" in FIG. 6 to "I" in FIG. 7 and then proceeds to step S60 in FIG. 7.

In step S60 in FIG. 7, the substitution manager 110 determines whether charge setting is configured in the substitution setting information (S60).

When charge setting is configured (YES in S60), the substitution manager 110 estimates the charge completion time, at which charging is due to be completed (S61). For example, the substitution manager 110 transmits to the vehicle 10 a request for transmitting a target SOC by charging and a charging current. The vehicle controller 58 calculates the charging current in accordance with the current sensed by the current sensor 46. The target SOC is preset on the vehicle controller 58. In response to the transmission request from the substitution manager 110, the vehicle controller 58 transmits the target SOC and the charging current to the substitution management server 18. The substitution manager 110 estimates the charge completion time in accordance with the received target SOC and charging current and the present SOC acquired in step S50.

Next, the substitution manager 110 determines whether the charge completion time is later than the designated delivery time (S62). The designated delivery time is included in the delivery information acquired from the deliverer server 16.

The orderer of an item does not necessarily designate a designated delivery time when ordering the item and may designate, for example, a delivery time slot or delivery date. When a delivery time slot is designated, the substitution manager 110 performs the operation in step S62 while the final time of the designated delivery time slot is deemed to be the designated delivery time. When a delivery date is designated, the substitution manager 110 performs the operation in step S62 while the final time available for delivery on the delivery date is deemed to be the designated delivery time.

When the charge completion time is equal to or earlier than the designated delivery time (NO in S62), it is assumed that charging is completed when or before the delivery person arrives at the location of the vehicle 10. Thus, the substitution manager 110 determines to set detachment substitution (S65) and ends the substitution determination operation.

When the charge completion time is later than the designated delivery time (YES in S62), it is assumed that charging is not completed when or before the delivery person arrives at the location of the vehicle 10. Thus, in this case, the substitution manager 110 determines whether the delivery time is changeable (S63). The determination of whether the delivery time is changeable may be made based on, for example, the type of the item to be delivered. For example, when the item to be delivered is an item unsuitable to delay delivery, such as a meal or perishable food, the substitution manager 110 may determine that the delivery time is unchangeable. By contrast, for example, when the item to be delivered is an item unlikely affected by delay of delivery in quality, such as a canned food or household good, the substitution manager 110 may determine that the delivery time is changeable.

When the substitution manager 110 determines that the delivery time is changeable (YES in S63), the substitution manager 110 sets the designated delivery time at a time equal to or later than the charge completion time (S64). At this time, the substitution manager 110 may set the designated delivery time at the charge completion time or at a time later than the charge completion time. As the result of changing the designated delivery time to a time equal to or later than the charge completion time, the delivery person is due to arrive at the location of the vehicle 10 at a time equal to or later than the charge completion time, and it can be assumed that charging is completed when or before the delivery person reaches the location of the vehicle 10. Thus, when the designated delivery time is changed to a time equal to or later than the charge completion time, the substitution manager 110 determines to set detachment substitution (S65) and ends the substitution determination operation.

By contrast, when the substitution manager 110 determines that the delivery time is unchangeable (NO in S63), it is assumed that charging is not completed when or before the delivery person arrives at the location of the vehicle 10, the substitution manager 110 determines not to set substitution (S66) and ends the substitution determination operation.

In step S60, when charge setting is not configured (NO in S60), the substitution manager 110 determines whether discharge setting is configured in the substitution setting information (S67).

When discharge setting is configured (YES in S67), the substitution manager 110 determines to set detachment substitution (S68) and ends the substitution determination operation.

When discharge setting is not configured (NO in S67), the substitution manager 110 determines not to set substitution (S69) and ends the substitution determination operation.

In step S52 in FIG. 6, when the present SOC is not lower than the predetermined threshold, in other words, the present SOC is equal to or higher than the predetermined threshold (NO in S52), the substitution manager 110 moves from "II" in FIG. 6 to "II" in FIG. 8 and proceeds to step S70 in FIG. 8.

In step S70 in FIG. 8, the substitution manager 110 determines whether the acquired present coupling condition information indicates coupled (S70).

When the present coupling condition information does not indicate coupled, in other words, the present coupling condition information indicates uncoupled (NO in S70), the substitution manager 110 determines whether discharge setting is configured in the substitution setting information (S71).

When discharge setting is configured (YES in S71), the substitution manager 110 determines to set attachment substitution for discharging (S72) and ends the substitution determination operation.

When discharge setting is not configured (NO in S71), the substitution manager 110 determines not to set substitution (S73) and ends the substitution determination operation.

In step S70, when the present coupling condition information indicates coupled (YES in S70), the substitution manager 110 determines whether discharge setting is configured in the substitution setting information (S74).

When discharge setting is configured (YES in S74), the substitution manager 110 determines not to set substitution (S75) and ends the substitution determination operation.

When discharge setting is not configured (NO in S74), the substitution manager 110 determines whether charge setting is configured in the substitution setting information (S76).

When charge setting is not configured (NO in S76), the substitution manager 110 determines not to set substitution (S75) and ends the substitution determination operation.

When charge setting is configured (YES in S76), the substitution manager 110 determines to set detachment substitution (S77) and ends the substitution determination operation.

As described above, when a delivery person is to deliver an item to a delivery destination, the substitution manager 110 of the substitution system 1 of the first embodiment determines whether the vehicle 10 is present at the delivery destination. When the substitution manager 110 determines that the vehicle 10 is present at the delivery destination, the substitution manager 110 acquires the SOC of the vehicle battery 20 and the coupling condition information indicating whether the charge/discharge connector 34 is coupled to the charging port 40. Based on the SOC and the coupling condition information, the substitution manager 110 determines whether to set attachment substitution or detachment substitution. In attachment substitution, the delivery person who visits the delivery destination to deliver the item attaches the charge/discharge connector 34 to the charging port 40. In detachment substitution, the delivery person who visits the delivery destination to deliver the item detaches the charge/discharge connector 34 from the charging port 40.

With the substitution system 1 of the first embodiment, because the delivery person delivers the item and also carries out attachment/detachment of the charge/discharge connector 34 as a substitute at the delivery destination, a substitute to charge and discharge the vehicle 10 can be easily provided.

Second Embodiment

In the first embodiment, irrespective of substitution for charging or substitution for discharging, one threshold of SOC for determining whether to set attachment substitution or detachment substitution is set. By contrast, in a second embodiment, a charge threshold of SOC for determining whether to set attachment substitution for charging or detachment substitution for charging and a discharge threshold of SOC for determining whether to set attachment substitution for discharging or detachment substitution for discharging are individually set.

The charge threshold is set at a value greater than the discharge threshold. The charge threshold may be set at, for example, 90%. The charge threshold is not limited to this example and may be set at a value that enables determination of whether to carry out charging. The discharge threshold may be set at, for example, 10%. The charge threshold is not limited to this example and may be set at a value that enables determination of whether to carry out discharging.

FIG. 9 presents substitution patterns according to the second embodiment. As indicated in pattern a in FIG. 9, when charge setting is configured, the SOC is lower than the charge threshold, and the coupling condition information indicates uncoupled, the substitution manager 110 determines to set attachment substitution. In this case, as the result of attaching the charge/discharge connector 34 to the charging port 40, charging starts.

As indicated in pattern b in FIG. 9, when charge setting is configured, the SOC is lower than the charge threshold, and the coupling condition information indicates coupled, it can be assumed that charging is ongoing, and thus, the substitution manager 110 determines not to set substitution of attachment/detachment of the charge/discharge connector 34. In this case, when the delivery time is changeable, the substitution manager 110 changes the designated delivery time. As the result of changing the designated delivery time, the delivery person is due to visit the delivery destination after completion of charging, and thus, the substitution manager 110 determines to set detachment substitution.

As indicated in pattern c in FIG. 9, when charge setting is configured, the SOC is equal to or higher than the charge threshold, and the coupling condition information indicates uncoupled, the substitution manager 110 determines not to set substitution of attachment/detachment of the charge/discharge connector 34. Because attachment/detachment of the charge/discharge connector 34 is not carried out, charge of the vehicle battery 20 from the outside of the vehicle 10 is not performed.

As indicated in pattern d in FIG. 9, when charge setting is configured, the SOC is equal to or higher than the charge threshold, and the coupling condition information indicates coupled, it can be assumed that charging has been completed, and thus, the substitution manager 110 determines to set detachment substitution.

As indicated in pattern e in FIG. 9, when discharge setting is configured, the SOC is lower than the discharge threshold, and the coupling condition information indicates uncoupled, the substitution manager 110 determines not to set substitution of attachment/detachment of the charge/discharge connector 34. Because attachment/detachment of the charge/discharge connector 34 is not carried out, discharge of the vehicle battery 20 to the outside of the vehicle 10 is not performed.

As indicated in pattern f in FIG. 9, when discharge setting is configured, the SOC is lower than the discharge threshold, and the coupling condition information indicates coupled, it can be assumed that discharging has been completed, and thus, the substitution manager 110 determines to set detachment substitution.

As indicated in pattern g in FIG. 9, when discharge setting is configured, the SOC is equal to or higher than the discharge threshold, and the coupling condition information indicates uncoupled, the substitution manager 110 determines to set attachment substitution. In this case, as the result of attaching the charge/discharge connector 34 to the charging port 40, discharging starts.

As indicated in pattern h in FIG. 9, when discharge setting is configured, the SOC is equal to or higher than the discharge threshold, and the coupling condition information indicates coupled, it can be assumed that discharging is ongoing, and thus, the substitution manager 110 determines not to set substitution of attachment/detachment of the charge/discharge connector 34.

Patterns a, b, c, and d in FIG. 9 respectively correspond to patterns A, C, E, and G in FIG. 3. Patterns e, f, g, and h in FIG. 9 respectively correspond to patterns B, D, F, and H in FIG. 3.

Because two thresholds of the charge threshold and the discharge threshold are set in the second embodiment, the second embodiment differs from the first embodiment in details of the substitution determination operation (S33) in FIG. 5. The following describes a flow of the substitution determination operation (S33) according to the second embodiment with reference to FIGS. 10 to 12. The operations other than the substitution determination operation (S33) in the second embodiment are the same as in the first embodiment, and descriptions thereof are not repeated in the second embodiment.

Figure 10:
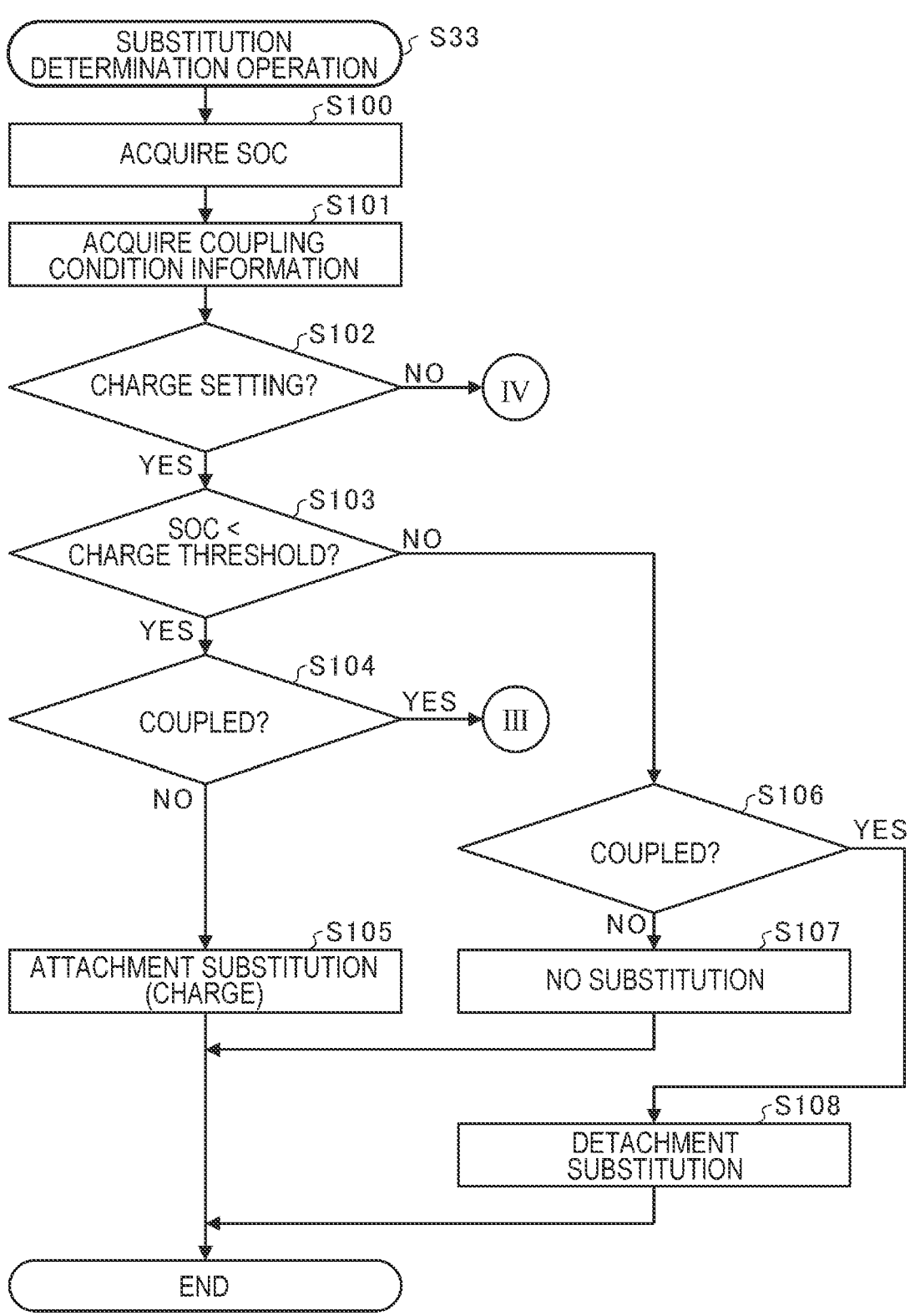
FIG. 10 provides a flowchart illustrating a flow of a substitution determination operation according to the embodiment.
Figure 11:
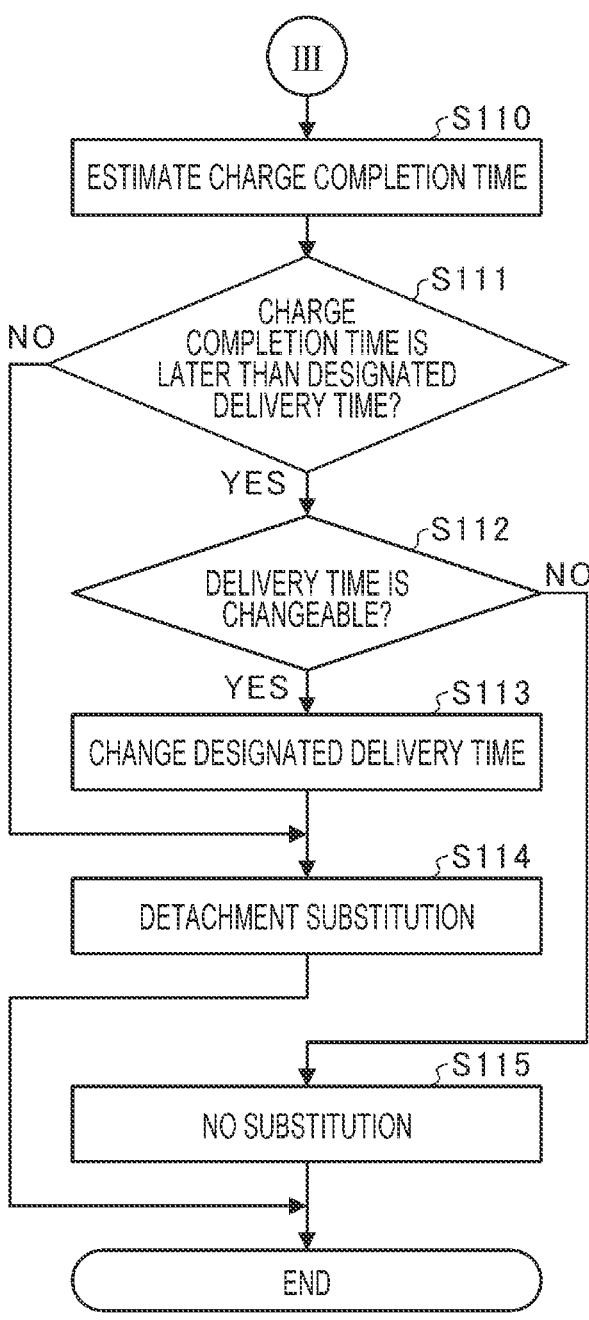
FIG. 11 provides a flowchart illustrating the flow of the substitution determination operation according to the embodiment.
Figure 12:
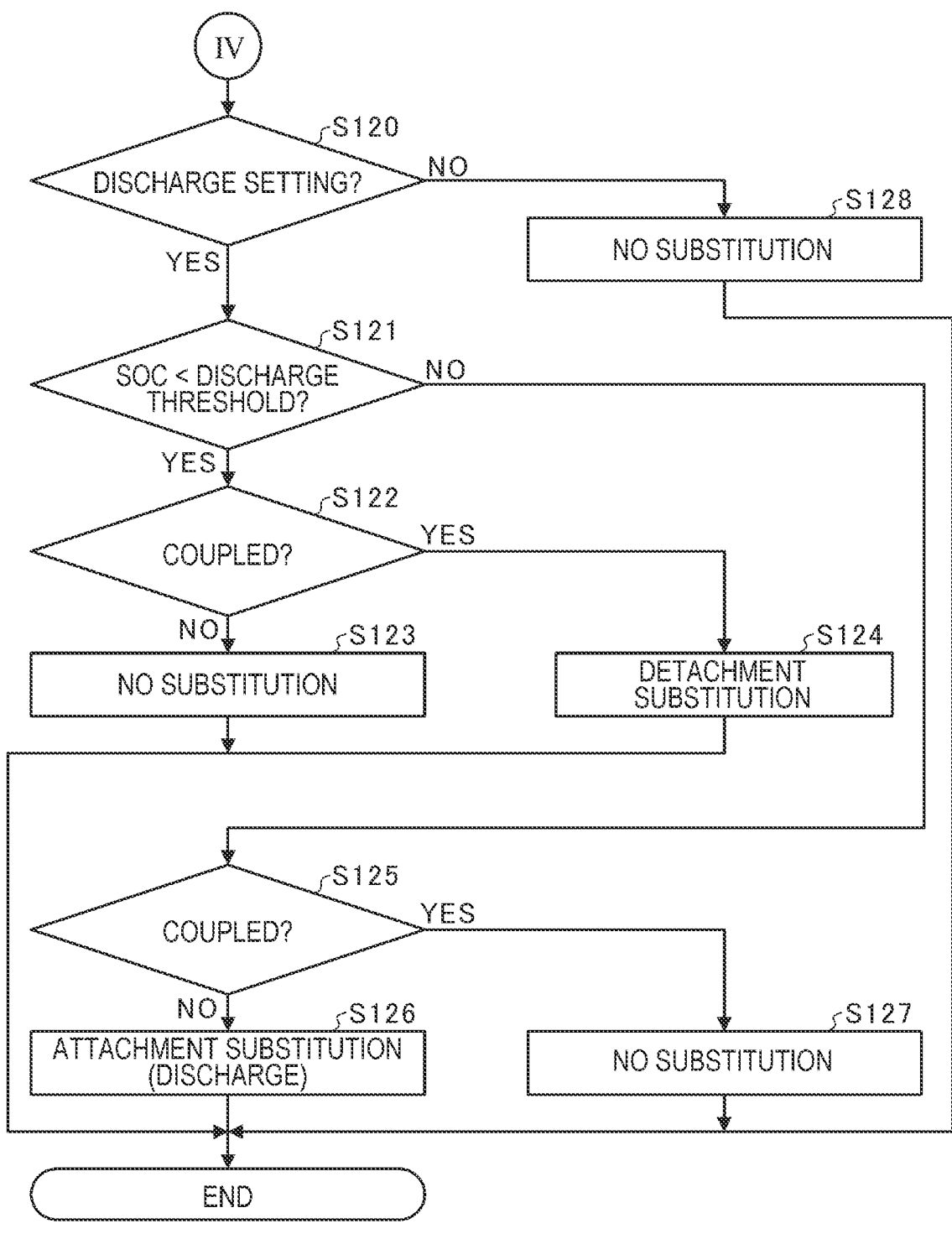
FIG. 12 provides a flowchart illustrating the flow of the substitution determination operation according to the embodiment.

FIGS. 10, 11, and 12 provide a flowchart illustrating a flow of the substitution determination operation (S33) according to the second embodiment. "III" in FIG. 10 is connected to "III" in FIG. 11. "IV" in FIG. 10 is connected to "IV" in FIG. 12.

As illustrated in FIG. 10, when the substitution determination operation starts, the substitution manager 110 acquires from the vehicle 10 determined to be present at the delivery destination the present SOC of the vehicle battery 20 of the vehicle 10 (S100). Next, the substitution manager 110 acquires the present coupling condition information from the vehicle 10 (S101).

Next, the substitution manager 110 determines whether charge setting is configured in the substitution setting information (S102). When charge setting is configured (YES in S102), the substitution manager 110 determines whether the present SOC acquired from the vehicle 10 is lower than the predetermined charge threshold (S103).

When the present SOC is lower than the predetermined charge threshold (YES in S103), the substitution manager 110 determines whether the present coupling condition information indicates coupled (S104).

When the present coupling condition information does not indicate coupled, in other words, the present coupling condition information indicates uncoupled (NO in S104), the substitution manager 110 determines to set attachment substitution for charging (S105) and ends the substitution determination operation.

When the present coupling condition information indicates coupled (YES in S104), the substitution manager 110 moves from "III" in FIG. 10 to "III" in FIG. 11 and then proceeds to step S110 in FIG. 11.

In step S110 in FIG. 11, the substitution manager 110 estimates the charge completion time (S110). Next, the substitution manager 110 determines whether the charge completion time is later than the designated delivery time (S111). When the charge completion time is equal to or earlier than the designated delivery time (NO in S111), it is assumed that charging is completed when or before the delivery person arrives at the location of the vehicle 10. Thus, the substitution manager 110 determines to set detachment substitution (S114) and ends the substitution determination operation.

When the charge completion time is later than the designated delivery time (YES in S111), the substitution manager 110 determines whether the delivery time is changeable (S112). When the substitution manager 110 determines that the delivery time is changeable (YES in S112), the substitution manager 110 sets the designated delivery time at a time equal to or later than the charge completion time (S113). The substitution manager 110 then determines to set detachment substitution (S114) and ends the substitution determination operation.

When the substitution manager 110 determines that the delivery time is unchangeable (NO in S112), it is assumed that charging is not completed when or before the delivery person arrives at the location of the vehicle 10, the substitution manager 110 determines not to set substitution (S115) and ends the substitution determination operation.

In step S103 in FIG. 10, when the present SOC is not lower than the predetermined charge threshold, in other words, the present SOC is equal to or higher than the predetermined charge threshold (NO in S103), the substitution manager 110 determines whether the present coupling condition information indicates coupled (S106).

When the present coupling condition information does not indicate coupled, in other words, the present coupling condition information indicates uncoupled (NO in S106), the substitution manager 110 determines not to set substitution (S107) and ends the substitution determination operation.

When the present coupling condition information indicates coupled (YES in S106), the substitution manager 110 determines to set detachment substitution (S108) and ends the substitution determination operation.

In step S102, when charge setting is not configured (NO in S102), the substitution manager 110 moves from "IV" in FIG. 10 to "IV" in FIG. 12 and proceeds to step S120 in FIG. 12.

In step S120 in FIG. 12, the substitution manager 110 determines whether discharge setting is configured in the substitution setting information (S120). When discharge setting is configured (YES in S120), the substitution manager 110 determines whether the present SOC acquired from the vehicle 10 is lower than the predetermined discharge threshold (S121).

When the present SOC is lower than the predetermined discharge threshold (YES in S121), the substitution manager 110 determines whether the present coupling condition information indicates coupled (S122).

When the present coupling condition information does not indicate coupled, in other words, the present coupling condition information indicates uncoupled (NO in S122), the substitution manager 110 determines not to set substitution (S123) and ends the substitution determination operation.

When the present coupling condition information indicates coupled (YES in S122), the substitution manager 110 determines to set detachment substitution (S124) and ends the substitution determination operation.

In step S121, when the present SOC is not lower than the predetermined discharge threshold, in other words, the present SOC is equal to or higher than the predetermined discharge threshold (NO in S121), the substitution manager 110 determines whether the present coupling condition information indicates coupled (S125).

When the present coupling condition information does not indicate coupled, in other words, the present coupling condition information indicates uncoupled (NO in S125), the substitution manager 110 determines to set attachment substitution for discharging (S126) and ends the substitution determination operation.

When the present coupling condition information indicates coupled (YES in S125), the substitution manager 110 determines not to set substitution (S127) and ends the substitution determination operation.

In step S120, when discharge setting is not configured (NO in S120), the substitution manager 110 determines not to set substitution (S128) and ends the substitution determination operation.

With the substitution system 1 of the second embodiment, similarly to the first embodiment, because the delivery person delivers the item and also carries out attachment/detachment of the charge/discharge connector 34 as a substitute at the delivery destination, a substitute to charge and discharge the vehicle 10 can be easily provided.

Further, in the substitution system 1 of the second embodiment, attachment substitution for charging or detachment substitution for charging is determined based on the charge threshold, and attachment substitution for discharging or detachment substitution for discharging is determined based on the discharge threshold. Thus, in the substitution system 1 of the second embodiment, setting of attachment substitution for charging or detachment substitution for charging and setting of attachment substitution for discharging or detachment substitution for discharging can be individually configured when the SOC indicates necessity of charging or discharging. As a result, with the substitution system 1 of the second embodiment, it is possible to more effectively perform charging or discharging.

Although embodiments of the disclosure have been described with reference to the accompanying drawings, the disclosure is not limited to the embodiments. It is understood that various modifications and alterations within the scope indicated in the claims may occur to those skilled in the art, and these are also embraced within the technical scope of the disclosure.

For example, in the embodiments described above, the deliverer server 16 serving as the delivery manager 90 and the substitution management server 18 serving as the substitution manager 110 are individually provided. However, the deliverer server 16 may include the function of the substitution management server 18.

Further, in the embodiments described above, a determination of whether to set attachment substitution or detachment substitution is made when the delivery departure time arrives. However, the substitution manager 110 may determine whether to set attachment substitution or detachment substitution when an arrival due time arrives. The arrival due time is a time when a delivery person is due to reach a delivery destination. Alternatively, the substitution manager 110 may determine whether to set attachment substitution or detachment substitution at any time between the delivery departure time and the arrival due time. Alternatively, in the case in which the substitution manager 110 acquires information of the delivery departure time in advance, the substitution manager 110 may determine whether to set attachment substitution or detachment substitution before the delivery departure time.

The invention claimed is:

1. A substitution system comprising:
a vehicle comprising a vehicle battery and a charging port electrically coupled to the vehicle battery;
a charge/discharge connector configured to be attached to the charging port in a detachable manner, the charge/discharge connector being configured to supply electric power from outside of the vehicle to the vehicle or supply electric power from the vehicle to outside of the vehicle; and
a control device comprising at least one processor and at least one memory coupled to the at least one processor, wherein the at least one processor is configured to perform an operation comprising:
when a delivery person is to deliver an item to a delivery destination, determining whether the vehicle is present at the delivery destination by comparing location information of the vehicle, acquired via a global positioning system, with location information of the delivery destination within a predetermined allowable range of error; and
in a case where the processor determines that the vehicle is present at the delivery destination, acquiring a SOC of the vehicle battery via electronic communication with the vehicle and coupling condition information indicating whether the charge/discharge connector is coupled to the charging port via a coupling sensor configured to detect attachment of the charge/discharge connector to the charging port or detachment of the charge/discharge connector from the charging port, and determining whether to set attachment substitution or detachment substitution in accordance with the SOC and the coupling condition information by executing predetermined substitution determination logic,
wherein, in the attachment substitution, the delivery person who visits the delivery destination to deliver the item attaches the charge/discharge connector to the charging port to start charging or discharging of the vehicle battery, and
wherein, in the detachment substitution, the delivery person who visits the delivery destination to deliver the item detaches the charge/discharge connector from the charging port to stop charging or discharging of the vehicle battery.

2. The substitution system according to claim 1, wherein the at least one processor is further configured to perform an operation comprising:
in a case where the SOC is lower than a predetermined threshold, and the coupling condition information indicates that the charge/discharge connector is not coupled to the charging port, setting the attachment substitution; and
in a case where the SOC is equal to or higher than the predetermined threshold, and the coupling condition information indicates that the charge/discharge connector is coupled to the charging port, setting the detachment substitution.

3. The substitution system according to claim 1, wherein the at least one processor is configured to further perform an operation comprising:
in a case where the SOC is lower than a predetermined threshold, and the coupling condition information indicates that the charge/discharge connector is coupled to the charging port, estimating a charge completion time at which charging of the vehicle battery is to be completed;
determining whether the charge completion time is later than a designated delivery time, the designated delivery time being a delivery time designated by an orderer of the item; and
in a case where the charge completion time is later than the designated delivery time, changing the designated delivery time to a time equal to or later than the charge completion time and setting the detachment substitution.

4. The substitution system according to claim 2, wherein the at least one processor is further configured to perform an operation comprising:

in a case where the SOC is lower than the predetermined threshold, and the coupling condition information indicates that the charge/discharge connector is coupled to the charging port, estimating a charge completion time at which charging of the vehicle battery is to be completed;

determining whether the charge completion time is later than a designated delivery time, the designated delivery time being a delivery time designated by an orderer of the item; and in a case where the charge completion time is later than the designated delivery time, changing the designated delivery time to a time equal to or later than the charge completion time and setting the detachment substitution.

5. The substitution system according to claim 3, wherein the at least one processor is further configured to perform an operation comprising:

in a case where the charge completion time is later than the designated delivery time, determining whether a delivery time of the item is changeable;

in a case where the at least one processor determines that the delivery time of the item is changeable, changing the designated delivery time to a time equal to or later than the charge completion time and setting the detachment substitution; and in a case where the at least one processor determines that the delivery time of the item is unchangeable, not changing the designated delivery time and not setting the attachment substitution or the detachment substitution.

6. The substitution system according to claim 4, wherein the at least one processor is further configured to perform an operation comprising:

in a case where the charge completion time is later than the designated delivery time, determining whether a delivery time of the item is changeable;

in a case where the at least one processor determines that the delivery time of the item is changeable, changing the designated delivery time to a time equal to or later than the charge completion time and setting the detachment substitution; and in a case where the at least one processor determines that the delivery time of the item is unchangeable, not changing the designated delivery time and not setting the attachment substitution or the detachment substitution.

7. The substitution system according to claim 1, wherein the vehicle further comprises a voltage sensor configured to sense a voltage at an input/output terminal of the vehicle battery and a current sensor configured to sense a current at the input/output terminal of the vehicle battery, wherein the vehicle further comprises a vehicle controller configured to calculate the SOC of the vehicle battery based on the sensed voltage and the sensed current and to transmit the SOC to the control device via electronic communication, and wherein the substitution system further comprises a power conversion device configured to be electrically coupled to an external electric power system and to the charge/discharge connector, the power conversion device being configured, when the charge/discharge connector is attached to the charging port in accordance with attachment substitution, to supply electric power between the external electric power system and the vehicle battery, and, when the charge/discharge connector is detached from the charging port in accordance with detachment substitution, to stop supplying electric power between the external electric power system and the vehicle battery.

* * * * *